US 11,278,971 B2

(12) United States Patent
Cox

(10) Patent No.: US 11,278,971 B2
(45) Date of Patent: Mar. 22, 2022

(54) DRILL STEEL AND ITS MANUFACTURE

(71) Applicant: Daltron Forge (Pty) Ltd, Johannesburg (ZA)

(72) Inventor: Dale Robert Cox, Boksburg (ZA)

(73) Assignee: Daltron Forge (Pty) Ltd, Johannesburg (ZA)

( * ) Notice: Subject to any disclaimer, the term of this patent is extended or adjusted under 35 U.S.C. 154(b) by 53 days.

(21) Appl. No.: 16/836,628

(22) Filed: Mar. 31, 2020

(65) Prior Publication Data

US 2020/0316695 A1     Oct. 8, 2020

(30) Foreign Application Priority Data

Apr. 2, 2019  (ZA) .................. 2019/02043

(51) Int. Cl.
| | |
|---|---|
| *B21K 5/02* | (2006.01) |
| *E21B 17/03* | (2006.01) |
| *B23B 51/02* | (2006.01) |
| *E21B 10/00* | (2006.01) |

(52) U.S. Cl.
CPC ............ *B23B 51/02* (2013.01); *B21K 5/02* (2013.01); *E21B 10/00* (2013.01); *E21B 17/03* (2013.01)

(58) Field of Classification Search
CPC .......... E21B 17/00; E21B 17/02; E21B 17/03; B25D 17/02; B25D 17/082; Y10T 279/1711; Y10T 403/7098; Y10T 408/97; E21D 20/003; E02D 5/80; F16L 19/08; F16L 19/10; G01N 30/6039
See application file for complete search history.

(56) References Cited

U.S. PATENT DOCUMENTS

| | | | | |
|---|---|---|---|---|
| 576,660 | A * | 2/1897 | Cramer ............... | B05B 13/0405 74/829 |
| 784,416 | A * | 3/1905 | McDonald ............. | F16L 19/10 285/341 |
| 1,738,687 | A * | 12/1929 | Brandt .................... | B23P 19/06 29/26 R |
| 1,896,371 | A * | 2/1933 | Quarnstrom ........... | F16L 19/10 285/341 |
| 2,069,177 | A * | 1/1937 | Craver .................... | F16L 19/10 277/626 |
| 2,676,098 | A * | 4/1954 | Payson ................... | C22C 38/44 420/108 |
| 2,794,661 | A * | 6/1957 | Sears .................... | B25D 17/082 403/227 |
| 2,830,792 | A * | 4/1958 | Sears .................... | B25D 17/08 279/19.5 |

(Continued)

FOREIGN PATENT DOCUMENTS

| | | | | |
|---|---|---|---|---|
| CA | 2555533 A1 * | 2/2008 | ............... | B25F 3/00 |
| CN | 102644441 A * | 8/2012 | | |

(Continued)

*Primary Examiner* — Jennifer H Gay
(74) *Attorney, Agent, or Firm* — Knobbe, Martens, Olson & Bear, LLP

(57) ABSTRACT

A drill steel includes a metal rod with an end to fit within a chuck of a drilling machine, and an integrally formed collar provided along the length of the metal rod. A ferrule is fastened on the metal rod adjacent the integrally formed collar on the side of the end of the metal rod. The ferrule forms a stop that prevents the drill steel from moving too far into the chuck.

20 Claims, 3 Drawing Sheets

(56) References Cited

U.S. PATENT DOCUMENTS

| | | | | | |
|---|---|---|---|---|---|
| 2,889,867 | A | * | 6/1959 | Phillips, Sr. | B21D 39/04 72/429 |
| 2,997,024 | A | * | 8/1961 | McLean | B25D 17/082 173/210 |
| 3,112,940 | A | * | 12/1963 | Crawford | F16L 19/10 285/341 |
| 3,215,443 | A | * | 11/1965 | Irving | E21B 21/02 279/20 |
| 3,783,970 | A | * | 1/1974 | Danielson | B25D 17/11 181/207 |
| 4,688,856 | A | * | 8/1987 | Elfgen | E21C 35/18 299/104 |
| 4,834,594 | A | * | 5/1989 | Morgan | E21B 3/02 175/320 |
| 5,400,861 | A | * | 3/1995 | Sheirer | E21B 17/03 175/427 |
| 6,598,688 | B2 | * | 7/2003 | Wang | E21B 17/046 175/320 |
| 7,207,400 | B2 | * | 4/2007 | Bise | E21B 17/03 175/320 |
| 8,302,708 | B1 | * | 11/2012 | Cox | E21B 17/03 175/300 |
| 2003/0010539 | A1 | * | 1/2003 | Wang | E21D 20/003 175/320 |
| 2005/0224259 | A1 | * | 10/2005 | Bise | E21B 17/046 175/320 |
| 2010/0213705 | A1 | * | 8/2010 | Williams | F16L 19/10 285/332.3 |
| 2011/0298211 | A1 | * | 12/2011 | Williams | F16L 19/103 285/389 |
| 2012/0005878 | A1 | * | 1/2012 | Rubinski | F16L 19/083 29/525.11 |
| 2012/0205304 | A1 | * | 8/2012 | Plant | G01N 30/6026 210/198.2 |
| 2015/0300542 | A1 | * | 10/2015 | Graham | G01N 30/6026 285/393 |
| 2017/0100136 | A1 | * | 4/2017 | Dougherty | A61B 17/1633 |
| 2020/0316695 | A1 | * | 10/2020 | Cox | E21B 10/00 |
| 2021/0115739 | A1 | * | 4/2021 | Dux | E21B 17/03 |

FOREIGN PATENT DOCUMENTS

| | | | | | |
|---|---|---|---|---|---|
| DE | 1184160 | B | * | 12/1964 | F16L 19/10 |
| DE | 2312478 | A1 | * | 9/1973 | F16L 47/04 |
| EP | 2502707 | A1 | * | 9/2012 | F16B 37/122 |
| FR | 1457029 | A | * | 7/1966 | F16L 19/10 |
| FR | 2394737 | A | * | 6/1977 | F16L 19/08 |
| GB | 811384 | A | * | 4/1959 | F16L 19/08 |
| GB | 1265158 | A | * | 3/1972 | F16L 19/08 |
| GB | 1361372 | A | * | 7/1974 | F16L 19/10 |
| JP | S6139802 | Y2 | * | 2/1986 | E02D 29/02 |
| KR | 20170047881 | A | * | 5/2017 | F16L 19/06 |
| RU | 18249 | U1 | * | 6/2001 | B25B 27/02 |
| WO | WO-2010096675 | A1 | * | 8/2010 | F16L 19/103 |
| WO | WO-2010129756 | A1 | * | 11/2010 | F16L 19/045 |
| WO | WO-2011009038 | A1 | * | 1/2011 | G01N 30/6026 |

* cited by examiner

DRILL STEEL AND ITS MANUFACTURE

FIELD OF THE INVENTION

The invention relates to a drill steel and to a method of manufacturing a drill steel.

BACKGROUND TO THE INVENTION

Drill steels are elongate rods that are used in rock drilling. One end of the drill steel is gripped by a chuck of a drilling machine and the opposite end is threaded to enable a drill bit to be fastened to it. Drill steels have a length that vary depending on their application, and may for example be from 800 mm to 4,000 mm in length depending on the length of the hole which is to be formed which may be for anchoring or blasting purposes. Drill steels may be used with handheld or machine-operated hydraulic drills such as those used by miners in soft rock underground mines for forming holes for roof bolts. Coal mines are one form of soft rock mining where the use of drill steels is common. Drill steels may also be used for drilling machines in applications such as ground stabilization for building roads or other structures.

One type of drill steel has a hexagonal cross-section with a central bore extending along its length. A coolant liquid is pumped from an opening at a base of the chuck through the bore towards the end of the drill steel so as to cool and lubricate the drill bit.

Most chucks for industrial drilling machines used in mining are designed to fit a 22.4 mm AF ("Across Flat") width hexagonal drill steel. However, narrower drill steels have been found to be sufficiently robust for most applications and are less expensive to manufacture. It has therefore become common to form a drill steel from a narrower, 19.2 mm width hexagonal rod which has a 5.6 mm diameter central bore, and to then upset forge one end of the rod to 22.4 mm width using a hot forging process so that it fits the chuck.

In these drill steels, a length of about 60 mm of the hexagonal rod is upset to 22.4 mm width and the rest remains at the original width of 19.2 mm. The 60 mm portion corresponds to the length that is received within the chuck of the drilling machine. A ferrule, which may be a rubber ferrule, is fastened onto the 19.2 mm wide portion at a shoulder where it adjoins the upset 22.4 mm wide portion. The purpose of the rubber ferrule is to prevent the drill steel from sliding into the drill chuck, and to assist in forming a liquid seal around the drill chuck to direct more of the coolant liquid through the central bore.

These rubber ferrules have been known to slip during operation when the forces exerted on them during drilling overcome the strength of the rubber to metal bond, which can result in damage to the drilling machines and loss of coolant liquid pressure through the central bore.

The invention aims to address these shortcomings, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

In this specification, the width of a hexagonal rod or hexagonal chamber will be understood to be the "Across Flat" (AF) width, which is the width as measured between two opposite flat surfaces of the hexagonal profile.

SUMMARY OF THE INVENTION

According to the invention there is provided a drill steel comprising a metal rod with a first end thereof to fit within a chuck of a drilling machine, wherein an integrally formed collar is provided along the length of the metal rod and a ferrule is fastened on the metal rod adjacent the integrally formed collar on the side of the first end of the metal rod, the ferrule forming a stop that prevents the drill steel from moving too far into the chuck.

Further features provide for the integrally formed collar to be forged.

Still further features provide for a washer to be interposed between the ferrule and the integrally formed collar. The washer may be made from high tensile strength material, such as heat-treated steel, and may have a thickness in its axial direction of between 3 mm and 8 mm; in one example about 5 mm, and may have a diameter consistent with the diameter of the ferrule.

A section of the drill steel adjacent the first end may be upset forged to have an increased cross-sectional width relative to the rest of the metal rod; and the integrally formed collar may be provided between the upset forged section and the rest of the metal rod.

The integrally formed collar may have a maximum cross-sectional width of from 25 mm to 35 mm, in one example about 28.5 mm. The length of the upset forged section may be selected to be about the length required to fit within a chuck of the drilling machine plus an axial length of the ferrule and thickness of the washer. The length of the upset forged section may, for example, be between 80 mm and 200 mm. In one embodiment, the length required to fit within a chuck of the drilling machine is about 60 mm, the ferrule with the washer have a combined axial length of about 80 mm, and the length of the upset forged section is about 140 mm.

The metal rod of the drill steel may have a hexagonal cross-section and the drill steel may have a bore extending axially along its length. The bore may have a diameter of from 3 mm to 8 mm, in one embodiment about 5.6 mm. The length of the drill steel may be from 500 mm to 5,000 mm and an end of the drill steel opposite the first end may be threaded.

The width of the upset forged section may be about 22.4 mm; and the width of the rest of the metal rod may be about 19.2 mm.

The ferrule may be formed by a rubber collar encased in a metal tube; the rubber collar may be bonded to the metal rod by an adhesive; and the metal tube may be crimped so that the ferrule is clamped in place.

The invention extends to a method of manufacturing a drill steel, the method comprising:
  connecting at least one electrode of an electric circuit to a metal rod in a position spaced from a first end of the metal rod;
  contacting the first end of the metal rod against an anvil within a die, the anvil being connected to the electric circuit, and the die having a main elongate chamber with a consistent width along its length;
  energizing the electric circuit so that electric current flows between the electrode and the anvil so as to heat a section of the metal rod between the electrode and the first end;

applying a force to compress the first end against the anvil such that the first end is upset forged within the die;

permitting heated material of the upset forged first end to move towards a mouth of the die and at least partly out of the main elongate chamber so as to widen and form an integral collar;

the force being applied continuously and the electric circuit being energized for at least 30 seconds;

allowing the upset first end to cool; and fastening a ferrule on the metal rod adjacent the collar on the side of the first end of the metal rod.

The method may include the step, prior to the step of fastening the ferrule on the metal rod, of placing a washer against the integrally formed collar on the side of the first end of the metal rod.

The anvil may be movable within the die, and the method may include the step of: as the force is applied, moving the anvil within the die in a direction away from the force. The force may be applied by means of a clamp that grips the metal rod. The clamp may be a pair of slotted pieces that grip the metal rod from opposite sides thereof.

The force may be applied for between 30 seconds and 5 minutes, more preferably between 1 minute and 4 minutes.

The method may include, during a first stage in which the first end is upset forged within the die, moving the anvil continuously within the die.

The method may include, during a second stage in which the integrally formed collar is formed, stopping the anvil and continuing to apply the force and the electric current so that the heated material of the first end moves out of the mouth of the die. In one embodiment, the force and the electric current are increased during the second stage.

The at least one electrode may be slidable along the metal rod and may remain stationary relative to the die as the metal rod is moved into the die during the first stage, such that the section of the metal rod being heated moves as the metal rod slides relative to the electrode.

During the second stage, the at least one electrode may be moved away from the die so as to prevent the electrodes from being contacted by the forming collar.

The main chamber of the die may be a hexagonal chamber, such as a 22.4 mm width hexagonal chamber, and may have an axial depth of least 140 mm. The anvil may have an enlarged head that is hexagonal with, for example a 22.4 mm width, and may move from one end of the hexagonal chamber to the other. The metal rod may have a hexagonal cross section and a round bore extending axially along its length. In one embodiment, the metal rod is a 19.2 mm width hexagonal metal rod with a round bore having a diameter of about 5.6 mm.

The method may include a step carried before or after the other steps of forming a thread in a second end of the metal rod opposite the first end.

An embodiment of the invention will now be described, by way of example only, with reference to the accompanying drawings.

DETAILED DESCRIPTION WITH REFERENCE TO THE DRAWINGS

Figure 1:
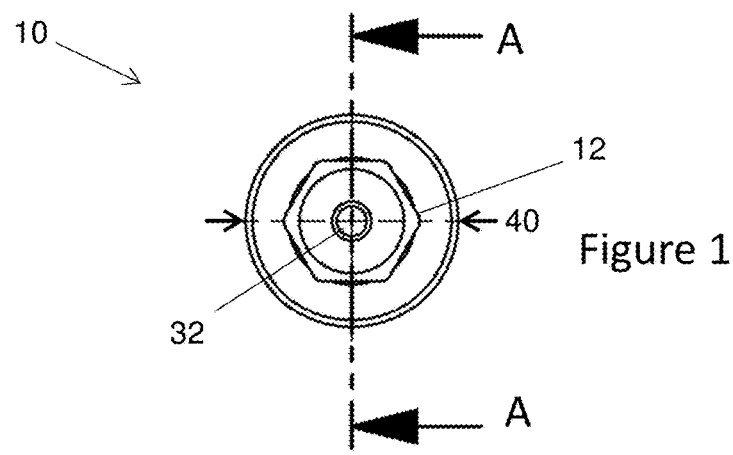
FIG. 1 is an end view of an embodiment of a drill steel according to the invention.
Figure 2:
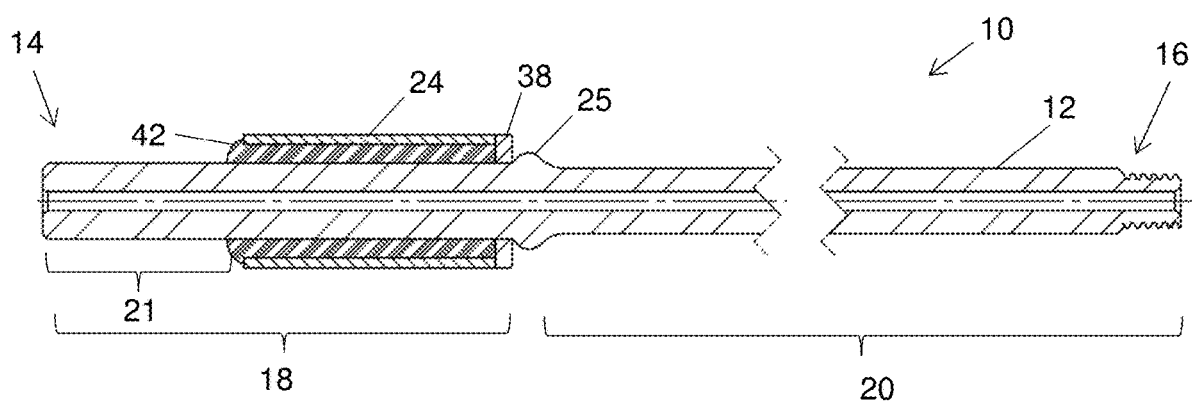
FIG. 2 is a sectional elevation along line A-A of FIG. 1.
Figure 3:
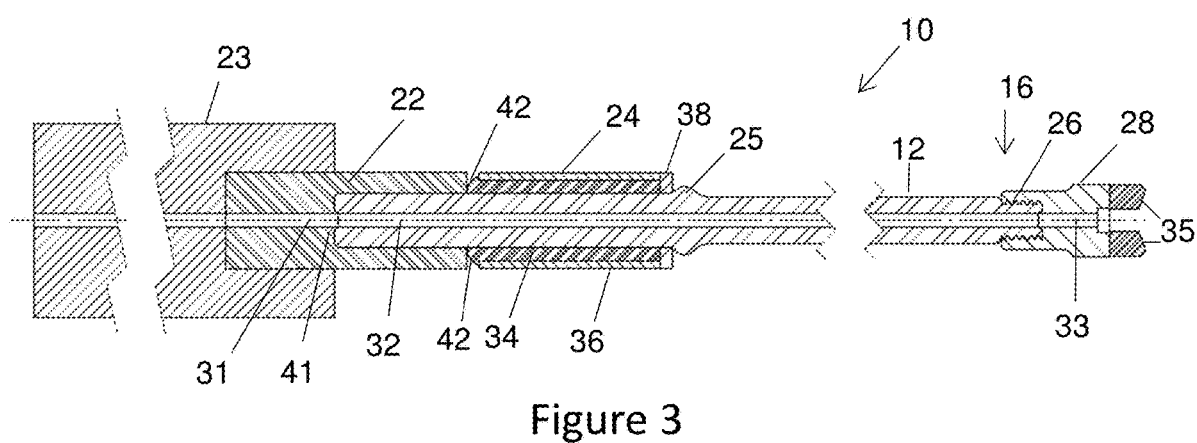
FIG. 3 is similar to FIG. 2 but shows a drill chuck and drill bit mounted to the drill steel.
Figure 4:
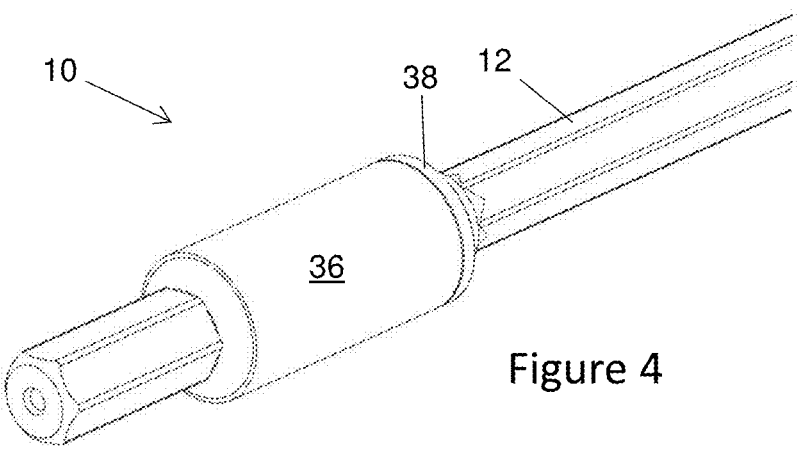
FIG. 4 is a first three-dimensional view of a portion of the drill steel of the preceding Figures.
Figure 5:
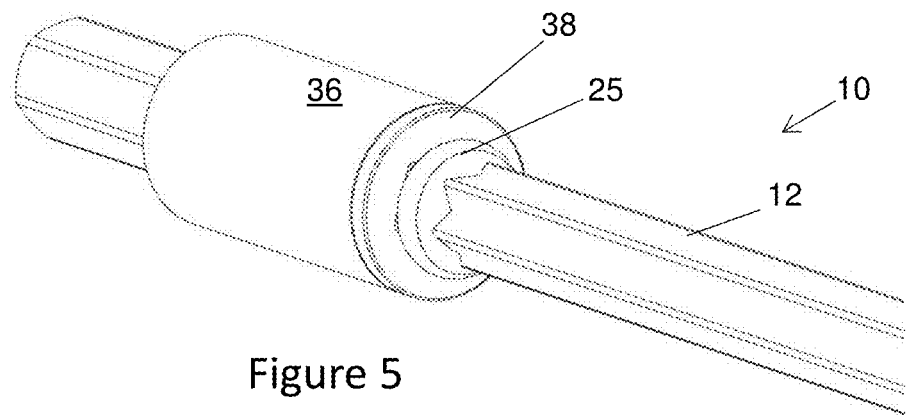
FIG. 5 is a second three-dimensional view of the portion of the drill steel of the preceding Figures.

FIGS. 1 to 6 show various views of a drill steel (10) according to an embodiment of the invention. The illustrated drill steel (10) includes a metal rod (12) that has a first end (14) and a second end (16). The first end (14) is dimensioned to fit within a chuck (22) of a drilling machine (23).

In this embodiment, a section (18) of the first end (14) is upset forged to have an increased cross-sectional width relative to most of the rest (20) of the metal rod (12), which remains at an original width. The upset forged section (18) has an axial length that is longer than a length (21) required to fit within a chuck (22) of a drilling machine (23). A ferrule (24) is fastened on the upset forged section (18) to form a stop that prevents the drill steel (10) from moving too far into the chuck (22). The second end (16) of the metal rod (12) may be threaded (26) so that a drill bit (28) is received on the threaded end (26).

In other embodiments, the metal rod (12) may not be upset forged and the ferrule (24) may simply be fastened at an appropriate point along the length of the metal rod.

An integrally formed collar (25) is provided along the length of the metal rod (12), and in the illustrated embodiment is located between the upset forged section (18) and the rest (20) of the metal rod (12). The collar may be forged as will be described below. A washer (38) is provided against the integrally formed collar (25) on a side of the first end (14) of the metal rod (12), and the ferrule (24) is fasted on the metal rod (12) adjacent the washer (38) so that the washer (38) is interposed between the ferrule (24) and the integrally formed collar (25).

The washer (38) may be made from high tensile strength material, such as heat-treated steel, and may have a thickness in its axial direction of between 3 mm and 8 mm. In one example, the washer (38) has a thickness of about 5 mm. As most clearly shown in FIG. 6, the washer (38) may have hexagonal inner surfaces dimensioned to fit over the first end (14) of the metal rod (12). The washer (38) functions to provide additional support to prevent the ferrule (24) from slipping and deforming over the collar (25), and it must therefore have a diameter that is preferably consistent with the diameter of the ferrule (24). In one embodiment, both the ferrule and the washer have a diameter of about 40 mm.

The collar (25) may have a maximum cross-sectional width (40) of from 25 mm to 35 mm. In one example, the collar may have a maximum cross-sectional width (40) of about 28.5 mm. The length of the upset forged section may be selected to be about the length required to fit within a chuck of the drilling machine plus an axial length of the ferrule and washer. The length of the upset forged section (18) may, for example, be between 80 mm and 200 mm. In one embodiment, the length (21) required to fit within a chuck of the drilling machine (23) is about 60 mm, the ferrule (24) with the washer (38) have a combined axial length of about 80 mm, and the length of the upset forged section is about 140 mm.

The metal rod (12) of the drill steel (10) may have a hexagonal cross-section as shown most clearly in FIG. 1, and it may have a central bore (32) extending axially along its length. The bore (32) may be a round bore with a diameter of from 3 mm to 8 mm, in one embodiment about 5.6 mm. The bore (32) forms a fluid conduit for conveying coolant liquid that is pumped from an opening (31) at a base of the chuck (22) towards the second end (16) of the metal rod (12) to cooperate with a bore (33) that extends through the drill bit (28), so as to cool and lubricate working tips (35) of the drill bit (28).

Depending on the application, the drill steel (10) may have a length that could be considerable and could range, for example, from 500 mm to 5,000 mm with 2,000 mm to 3,000 mm being the commonly used length. The range of applications for the drill steel (10) includes its use in soft rock mining where the drilling machine is a handheld or machine-operated hydraulic drill and is used for forming holes for roof bolts or other anchors, or in ground stabilization in building roads or other structures. In terms of materials, the metal rod (12) of the drill steel (10) is typically made of high tensile steel.

In some drilling machines, the chuck (22) is configured to fit a 22.4 mm AF ("Across Flat") width hexagonal drill steel. The width of the upset forged section (18) may therefore be about 22.4 mm so that it fits the chuck (22), and the rest (20) of the length of the drill steel (10) may be a narrower standard width hexagonal rod, such as a 19.2 mm hexagonal rod.

Figure 6:
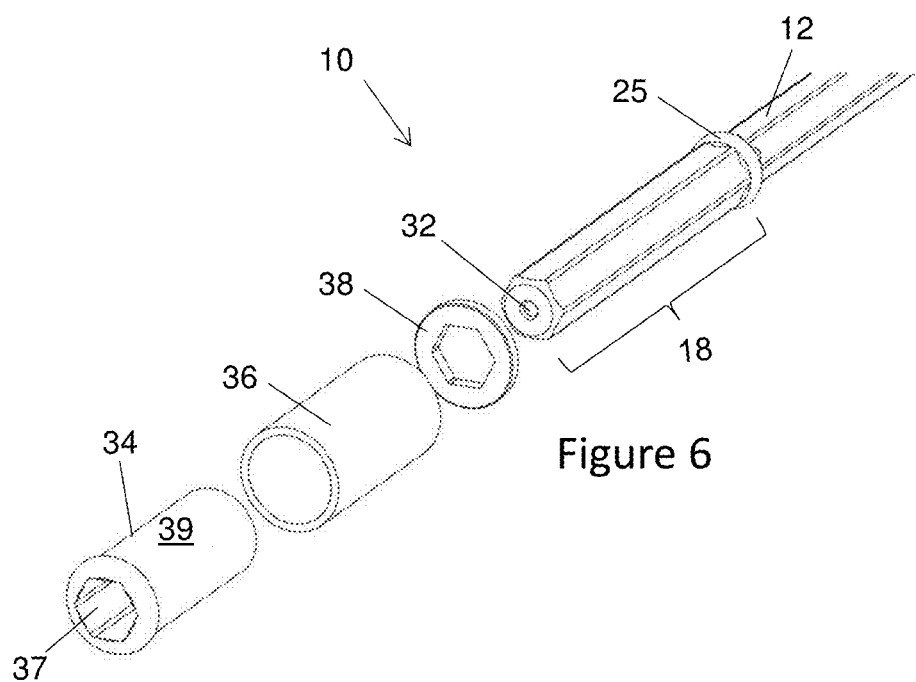
FIG. 6 is an exploded three-dimensional view of the portion of the drill steel of the preceding Figures showing component parts.

In the illustrated embodiment, the ferrule (24) is formed by a rubber collar (34) encased and bonded with adhesive in a mild steel tube (36), as most clearly shown in FIG. 6. The rubber collar (34) may be made from various rubber materials including styrene isoprene styrene (SIS) rubber or styrene butadiene rubber. The rubber collar (34) may have hexagonally moulded inner surfaces (37) to fit over the 22.4 mm hexagonal upset forged section (18), and a cylindrical outer surface (39) to fit snugly within the steel tube (36). The rubber collar (34) may be bonded to the steel tube (36) by means of an adhesive. In one embodiment, prior to being fastened in place the steel tube (36) has a diameter of 42 mm and the steel tube and rubber collar (34) have an axial length of 75 mm. When attaching the ferrule (24) to the metal rod (12), the washer (38) is first put in place over the first end (14) of the metal rod (12) until it abuts the integrally formed collar (25). Adhesive is then applied to the inner surfaces of the rubber collar (34) and a portion of the upset forged section (18) and the ferrule (24) is slid into place. The steel tube (36) is then crimped using a crimping machine that applies a force around the steel tube (36) to decrease its diameter to, for example, 39.5 mm so as to clamp the ferrule (24) in place. When the diameter of the steel tube (36) is decreased, the rubber collar (34) is compressed to form a bulge (42), most clearly shown in FIGS. 2 and 3. This bulge (42) forms a rubber seal that engages the drill chuck (22) to help prevent loss of coolant liquid.

The purpose of the ferrule (24) is to prevent the drill steel (10) from sliding too deep into the chuck (22) and damaging a base (41) of the drill chuck (22), and also to assist in forming a liquid seal around the drill chuck (22) to direct more coolant liquid through the central bore (32) towards the drill bit (28). The ferrule (24) may be subject to large forces in its axial direction during drilling operations. By providing an integrally formed collar (25) in the metal rod (12) with a washer (38) interposed between the collar (25) and the ferrule (24), the ferrule (24) is held in place much more securely than were no washer and collar to be present.

In experiments the applicant has found that the force required to move the ferrule in an axial direction towards the second end (16), which occurs when the washer (38) breaks and deforms over the collar (25), is between 120-140 kN as compared to only about 70 to 80 kN on existing drill steels where no collar (25) is present. This therefore results in an improved drill steel (10) in which the ferrule (24) is less likely to dislodge, and resultant damage to the drill chuck (22) and coolant liquid loss more often avoided. The drill steel of the invention is less reliant on the bond strength of the adhesive between the ferrule and the metal rod and therefore results in a more reliable product. There is also less elastic deformation of the rubber collar (34) during use when pressure is applied to it, which results in a better seal between the bulge (42) in the rubber collar (34) and the chuck (22) of the drilling machine (23).

Manufacturing the drill steel (10) which has a relatively long upset portion (18) requires a process that does not significantly constrict the central bore (32) and which yields an upset portion (18) with a sufficiently consistent width along its length so as to reduce the likelihood of rotational slipping within the chuck (22) and prevent excessive coolant from escaping the drill chuck (22).

Figure 7:
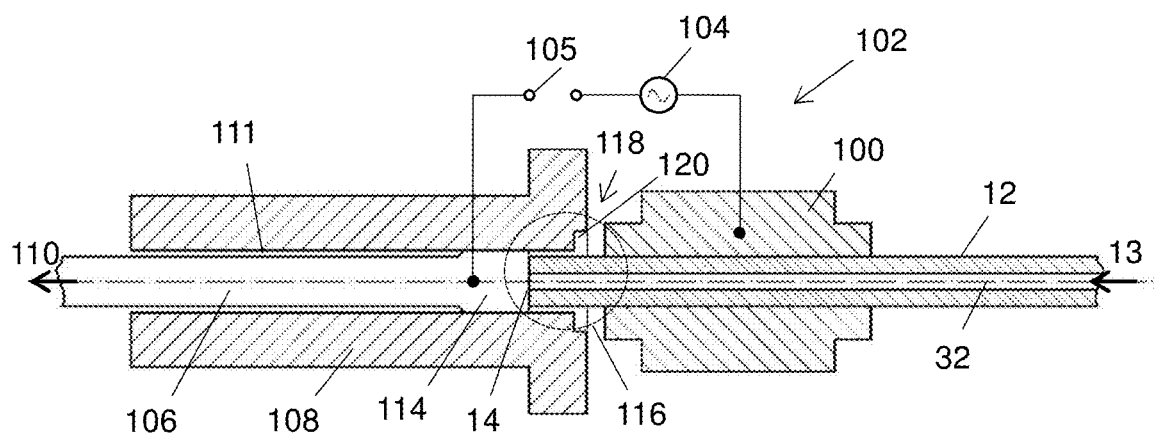
FIG. 7 is a schematic sectional view illustrating the start of a method of manufacturing a drill steel according to an embodiment of the invention.

FIG. 7 is a schematic sectional view illustrating the start of a method of manufacturing a drill steel according to the invention. A metal rod (12) is provided and at least one electrode (100) is connected to the metal rod (12) in a position spaced from a first end (14) of the metal rod (12). The metal rod (12) may be held in place by means of a clamp (not shown) which could, for example, be a pair of slotted pieces that grip the metal rod (12) from opposite sides thereof. The metal rod (12) may be a 19.2 mm hexagonal metal rod (12) as previously described, which includes a round bore (32) extending axially along its length.

In this embodiment, the at least one electrode is a pair of sliding electrodes (100) that are in contact with the metal rod (12) from opposite sides thereof and are in electrical connection with an electric circuit (102). The electric circuit (102) has a power source (104) such as a high-voltage alternating current source, which can be connected by means of a switch (105).

The first end (14) of the metal rod (12) is then contacted against an anvil (106) within a die (108), the anvil (106) also being connected to the electric circuit (102). In this embodiment the anvil (106) is movable within the die (108) in a direction shown by the arrow (110).

The die (108) may have a main elongate chamber (111) which has a consistent width along its length. The main chamber (111) may be a hexagonal chamber, such as a 22.4 mm width hexagonal chamber, and may have an axial depth of at least 140 mm. The anvil (106) may have an enlarged head (114) that is hexagonal with a 22.4 mm width so that the head (114) seals against inner surfaces of the main hexagonal chamber (111) of the die (108) and forms a piston head within the die (108). The anvil (106) may be mounted on a hydraulic piston (not shown) such that its movement can be controlled.

The electric circuit (102) is then energized by closing the switch (105) so as to connect the power source (104). Electric current then flows between the electrodes (100) and the anvil (106). Since both the anvil (106) and the electrodes (100) have large volumetric areas for conducting electricity, the portion of least volumetric area for conducting electricity, and consequently the portion with the highest resistance, is the section (116) of the metal rod (12) between the electrodes (100) and the anvil (106). Consequently, it is this section (116) that heats up the most. By injecting sufficiently large currents using the power source (104), this section (116) can be heated up to several hundred degrees Celsius so as to make the metal of that section malleable.

A force is then applied in a direction as shown by the arrow (13), which in this embodiment may be by means of a hydraulic cylinder connected to the clamp, so as to compress the first end (14) against the anvil (106) and begin to upset forge the first end (14) within the die (108).

Figure 8:
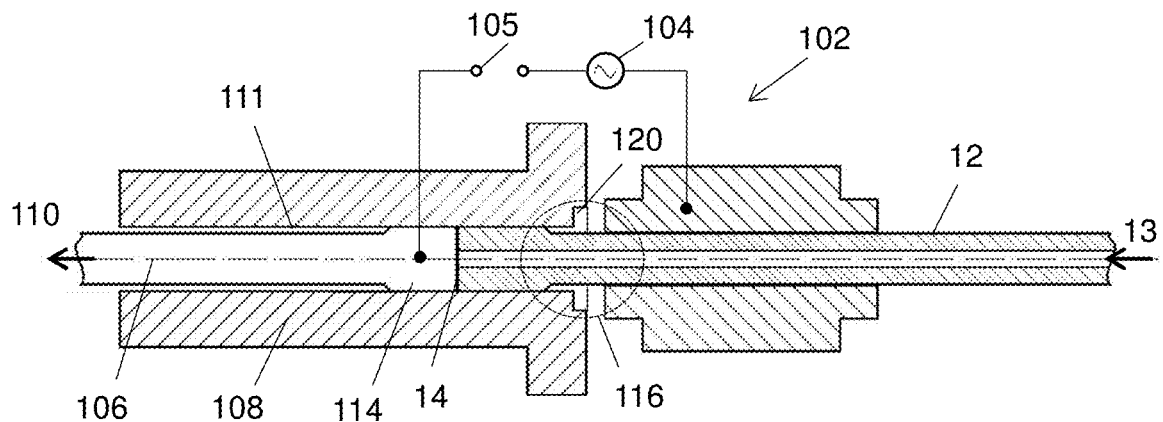
FIG. 8 is a schematic sectional view illustrating hot forging of a first end of a metal rod in the method of manufacturing a drill steel.

The method may then include the step of, as the force is applied and the electric current flows, gradually moving the anvil (106) in a direction away from the force as indicated by the arrow (110). This may be referred to as the first stage and is illustrated in FIG. 8, which is a schematic sectional view in which the anvil (106) has moved a short distance. As the anvil (106) gradually moves, the section (116) that is heated moves along the length of the metal rod (12). This happens because once a portion of the first end (14) is upset forged, the upset forged section makes electrical contact with the die (108), the die (108) also being in electrical contact with the anvil (106). The portion of least volumetric area for conducting electricity is then only the narrower, non-upset portion of the metal rod (12) that is not in direct physical contact with the die (108) or the electrodes (100), and the section (116) that is heated the most thus remains in the vicinity of a mouth (118) of the die (108).

Figure 9:
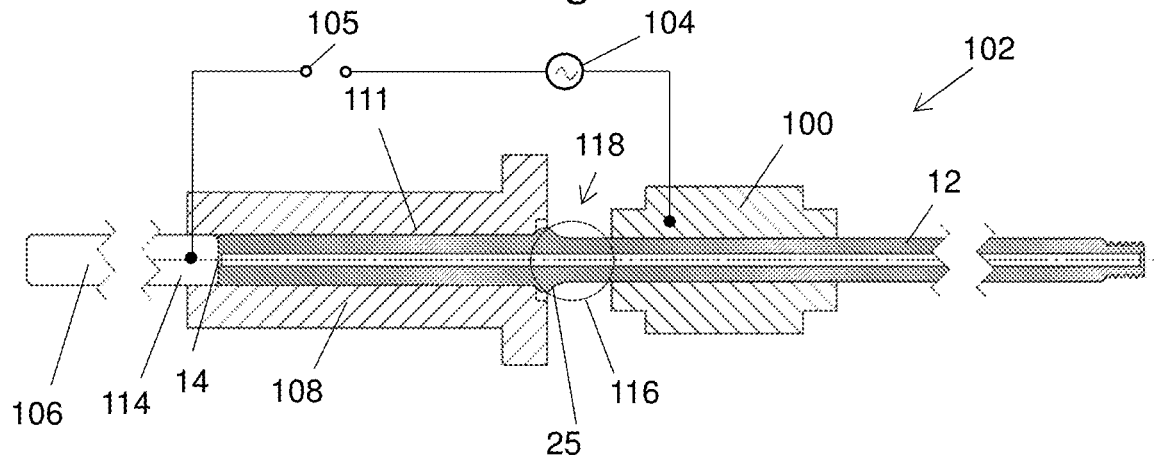
FIG. 9 is a schematic sectional view illustrating forming an integral collar in the method of manufacturing a drill steel according to the invention.

The anvil (106) continues to slowly move during the first stage from the position shown in FIG. 7 towards the final position shown in FIG. 9, over a period that may be between 30 seconds and 5 minutes, more preferably between 1 minute and 4 minutes. During this time, the force is continually applied so as to upset forge the portion of the metal rod (12) within the die (108), and the electric current flows to primarily heat the section (116) of the metal rod (12) that is not yet upset forged. The metal rod (12) slides past the electrodes (100) which remain stationary relative to the die (108). If, as in previously discussed embodiments, the upset portion is to be 140 mm long, the anvil (106) moves a total distance of 140 mm over the course of between 1 and 4 minutes.

When the anvil (106) reaches the position shown in FIG. 9, then a second stage begins during which the anvil (106) is stopped within the die (108) and heated metal of the upset forged first end (14) is permitted to move towards the mouth (118) of the die (108) and at least partly out of the main elongate chamber (111) so as to widen and form an integral collar (25). In one embodiment, both the force and the electric current are increased during the second stage so that heated metal can more easily move out of the main elongate chamber (111). During this second stage, as illustrated in FIG. 9, the slidable electrodes (100) are moved away from the die (108), while continuing to make contact with the metal rod (12), so as to prevent the electrodes (100) from being contacted by the forming collar (25) or red-hot metal of the rod (12) immediately adjacent the forming collar (25). The section (116) that is heated then also moves further out from the mouth (118) of the die (108).

At the end of the second stage, the switch (105) is opened so as to stop the electric current from flowing and the metal rod (12) is withdrawn from the die (108). The clamp can then be disconnected and the metal rod removed and allowed to cool, after which a washer (38) as previously described is fitted against the collar (25) and a ferrule (24) is attached against the washer. A thread (26) may then be formed in a second end (16) of the metal rod (12), to complete the method of making a drill steel (10). The thread (26) may, of course, also have been made prior to the forging steps.

By applying a continuous force and continuously heating a section (116) of the metal rod (12) that moves along its length, a very controlled finish is achieved along the length of the upset forged section (18). The width of the upset forged section (18) is therefore sufficiently consistent along its length to reduce the likelihood of slipping in the chuck (22), and the central bore (32) of the metal rod (12) is not severely constricted. If necessary, the central bore (32) can be drilled out so as to restore it to its full original diameter.

It will be appreciated that variations may be made from the described embodiments without departing from the scope of the invention, for example as to the dimensions, choice of material, and ranges of time are concerned. Simply by way of example, other drill steels that may be used may have a width for cooperation with a chuck of about 25.6 mm or 28.9 mm. A drill steel having one of these widths along its entire length could be used, or a first end of the drill steel of a smaller width (e.g. 22.4 mm or 25.6 mm) could be upset to a larger diameter (e.g. 25.6 mm or 28.9 mm, respectively), or drill steels could be used without upset forging the first end. The integrally formed collar could be provided in various ways including by cold forging.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

What is claimed is:

1. A drill steel comprising:
    a metal rod with a first end thereof configured to fit within a chuck of a drilling machine,
    an integrally formed collar provided along a length of the metal rod and
    a ferrule fastened on the metal rod adjacent the integrally formed collar on a side of the first end of the metal rod, wherein the ferrule forms a stop that prevents the drill steel from moving far into the chuck, and
    the metal rod of the drill steel has a bore extending axially centrally along the length thereof.

2. A drill steel as claimed in claim 1, wherein the integrally formed collar is forged.

3. A drill steel as claimed in claim 1, wherein a washer is interposed between the ferrule and the integrally formed collar, the washer being made from high tensile strength heat-treated steel.

4. A drill steel as claimed in claim 3, wherein the washer has a thickness in an axial direction thereof between 3 mm and 8 mm and has a diameter consistent with a diameter of the ferrule.

5. A drill steel as claimed in claim 1, wherein a section of the metal rod adjacent the first end is upset forged to have an increased cross-sectional width relative to a rest of the metal rod.

6. A drill steel as claimed in claim 5, wherein a length of an upset forged section is selected to be the length required to fit within the chuck of the drilling machine plus an axial length of the ferrule and a thickness of a washer interposed between the ferrule and the integrally formed collar.

7. A drill steel as claimed in claim 6, wherein the length required to fit within the chuck of the drilling machine is 60 mm, the ferrule with the washer have a combined axial length of about 80 mm, and the length of the upset forged section is 140 mm.

8. A drill steel as claimed in claim 5, wherein the integrally formed collar is provided between the upset forged section and a rest of the metal rod and the integrally formed collar has a maximum cross-sectional width of from 25 mm to 35 mm.

9. A drill steel as claimed in claim 1, wherein the metal rod of the drill steel has a hexagonal cross-section.

10. A drill steel as claimed in claim 1 wherein the length of the drill steel is from 500 mm to 5,000 mm, and an end of the metal rod opposite the first end is threaded.

11. A drill steel as claimed in claim 1 wherein the ferrule is formed by a rubber collar encased in a metal tube, and wherein the rubber collar is bonded to the metal rod by an adhesive and the metal tube is crimped so that the ferrule is clamped in place.

12. A method of manufacturing the drill steel according to claim 1, the method comprising:
- connecting at least one electrode of an electric circuit to the metal rod in a position spaced from a first end of the metal rod;
- contacting the first end of the metal rod against an anvil within a die, the anvil being connected to the electric circuit, and the die having a main elongate chamber with a consistent width along its length;
- energizing the electric circuit so that electric current flows between the electrode and the anvil so as to heat a section of the metal rod between the electrode and the first end;
- applying a force to compress the first end against the anvil such that the first end is upset forged within the die;
- permitting heated material of the upset forged first end to move towards a mouth of the die and at least partly out of the main elongate chamber so as to widen and form an integral collar;
- the force being applied continuously and the electric circuit being energized for at least 30 seconds;
- allowing the upset first end to cool; and
- fastening the ferrule on the metal rod adjacent the collar on the side of the first end of the metal rod.

13. A method as claimed in claim 12, including the step, prior to the step of fastening the ferrule on the metal rod, of placing a washer against the integrally formed collar on the side of the first end of the metal rod.

14. A method as claimed in claim 12, wherein the anvil is movable within the die, and the method includes the step of: as the force is applied, moving the anvil within the die in a direction away from the force.

15. A method as claimed in claim 12, wherein the force is applied for between 30 seconds and 5 minutes which is equal to an amount of time which the anvil takes to move from one end of the die to another.

16. A method as claimed in claim 12 wherein, during a first stage in which the first end is upset forged within the die, the anvil is moved continuously within the die.

17. A method as claimed in claim 16, wherein the electrode is slidable along the metal rod and remains stationary relative to the die as the metal rod is moved into the die during the first stage, such that the section of the metal rod being heated moves as the metal rod slides relative to the electrode.

18. A method as claimed in claim 16, wherein during a second stage in which the integrally formed collar is formed, stopping the anvil and continuing to apply the force and the electric current so that the heated material of the first end moves out of the mouth of the die, wherein the force and the electric current are increased during the second stage.

19. A method as claimed in claim 18, wherein during the second stage, the at least one electrode is moved away from the die so as to prevent the electrodes from being contacted by the forming collar.

20. A method as claimed in claim 12, wherein the main elongate chamber of the die is a hexagonal chamber with an axial depth of at least 140 mm, the anvil has an enlarged hexagonal head and moves from one end of the hexagonal chamber to another.

* * * * *